US008181945B2

(12) United States Patent
Miyahara et al.

(10) Patent No.: US 8,181,945 B2
(45) Date of Patent: May 22, 2012

(54) CYLINDRICAL VIBRATION ISOLATING DEVICE

(75) Inventors: Tetsuya Miyahara, Wako (JP); Tsutomu Ogawa, Wako (JP); Yuichi Nakamaru, Fujimino (JP); Yuji Muto, Fujimino (JP)

(73) Assignees: Honda Motor Co., Ltd., Tokyo (JP); Yamashita Rubber Kabushiki Kaisha, Fujimino-shi (JP)

( * ) Notice: Subject to any disclaimer, the term of this patent is extended or adjusted under 35 U.S.C. 154(b) by 982 days.

(21) Appl. No.: 12/122,068

(22) Filed: May 16, 2008

(65) Prior Publication Data

US 2008/0284076 A1    Nov. 20, 2008

(30) Foreign Application Priority Data

May 18, 2007   (JP) .................................. 2007-133559

(51) Int. Cl.
   *F16F 13/00* (2006.01)
(52) U.S. Cl. .................. 267/140.12; 267/141.2; 267/293
(58) Field of Classification Search ............. 267/140.13, 267/140.12, 141.2, 141.4, 141.5, 219, 293; 248/562, 636
   See application file for complete search history.

(56) References Cited

U.S. PATENT DOCUMENTS

| 4,883,260 | A | * | 11/1989 | Kanda ...................... 267/140.12 |
| 5,026,031 | A | * | 6/1991 | Court ....................... 267/140.12 |
| 5,062,654 | A | * | 11/1991 | Kakimoto et al. ..... 280/124.136 |
| 5,080,330 | A | * | 1/1992 | Nanno ..................... 267/140.12 |
| 5,190,269 | A | * | 3/1993 | Ikeda et al. .............. 267/140.12 |
| 5,261,748 | A | * | 11/1993 | Kameda ........................ 384/222 |
| 5,887,859 | A | * | 3/1999 | Hadano et al. ............. 267/141.1 |
| 5,954,350 | A | * | 9/1999 | Santo et al. ............ 280/124.107 |
| 6,293,531 | B1 | * | 9/2001 | Kato et al. ............... 267/140.12 |
| 7,234,693 | B2 | * | 6/2007 | Schnaars et al. ............. 267/293 |
| 7,370,852 | B2 | * | 5/2008 | Nicholson et al. ....... 267/140.12 |

FOREIGN PATENT DOCUMENTS

JP    2004-211791    7/2004

* cited by examiner

*Primary Examiner* — Robert A Siconolfi
*Assistant Examiner* — Mariano Sy
(74) *Attorney, Agent, or Firm* — Rankin, Hill & Clark LLP

(57) ABSTRACT

A cylindrical vibration isolating device that prevents damage to a vibration isolating rubber and cracks in a welded portion of a sub-frame. The sub-frame mount comprises an outer cylinder, an inner cylinder connected by the vibration isolating rubber. Small and large diameter portions are provided on a lateral wall of a barrel portion of the outer cylinder. Between the small and large diameter portions is formed a step-like boundary portion. The height in the axial direction of the boundary portion changes in the circumferential direction and has a substantially mountain-like shape with a top projecting in the press fitting direction. A contact area of the large diameter portion contacting a mounting hole of the sub-frame is increased in accordance with an amount of the press fitting. Therefore, when the sub-frame mount is press-fitted into the mounting hole of the sub-frame, the press fitting load is gradually increased.

13 Claims, 12 Drawing Sheets

US 8,181,945 B2

CYLINDRICAL VIBRATION ISOLATING DEVICE

BACKGROUND OF THE INVENTION

1. Field of the Invention

The present invention relates to a cylindrical vibration isolating device suitable for a sub-frame mount of motor vehicles.

2. Description of the Related Art

As an example of cylindrical vibration isolating devices in which an inner cylinder and an outer cylinder are connected by a vibration isolating rubber, there is known a sub-frame mount. This sub-frame mount is the cylindrical vibration isolating device having the inner and outer cylinders connected by the vibration isolating rubber, and has a large diameter portion formed of a vibration isolating rubber or the like on a partial surface of the outer cylinder. The large diameter portion is adapted to be press-fitted into a mounting hole of the sub-frame (as an example, see a patent reference 1).

Patent reference 1: Japanese patent laid-open publication No. 2004-211791.

FIG. 11 is a graph showing a change in a press fitting load when the sub-frame mount is press-fitted into the mounting hole provided in the sub-frame, wherein the vertical axis denotes the press fitting load and the horizontal axis denotes a press fitting stroke (a press fitting amount). A conventional sub-frame mount "a" shown in this graph is comprised of a flange "b" on one end thereof in the axial direction, a rubber seal "c" on the other end thereof, a large diameter portion "d" and a small diameter portion "e" on a middle barrel portion.

When this sub-frame mount "a" is press-fitted from the rubber seal portion "c" into the mounting hole of the sub-frame, firstly a comparatively small change of the press fitting load due to the change of the rubber seal portion "c" is created between a point P1 and a point P0. Next, when the large diameter portion "d" comes into contact with the mounting hole at the point P0, the press fitting load goes up rapidly to be a straight line of an acute angle between the point P0 and a point P4. This rapid rise of the press fitting load causes such a bad influence that the rubber seal portion "c" is damaged or that a crack is developed in a welded portion of the sub-frame.

Therefore, an object of the present invention is to prevent the rapid rise of the press fitting load.

SUMMARY OF THE INVENTION

To solve the above mentioned problem, in a first aspect of the present invention, a cylindrical vibration isolating device comprises an inner cylinder and an outer cylinder being connected through a vibration isolating rubber, a small diameter portion and a large diameter portion being provided on a lateral wall of a barrel portion of the outer cylinder, wherein a boundary portion between the small diameter portion and the large diameter portion is changed in height in an axial direction of the outer cylinder such that, when the outer cylinder is press-fitted into a mounting hole provided in a mounted member, a contact area between an inner peripheral surface of the mounting hole and the large diameter portion is gradually increased.

In a second aspect of the present invention, the boundary portion is formed substantially in the shape of a mountain and a top of the boundary portion projects on a forward side at the time of press fitting.

In a third aspect of the present invention, the top and a bottom of the boundary portion are arranged alternately and in pairs respectively in the circumferential direction on the lateral wall of the outer cylinder, wherein the pair of tops and the pair of bottoms are opposite to each other across a center axis of the device respectively, and the tops of the boundary portion are located in one of two orthogonal directions meeting at right angles with an axis of the outer cylinder while the bottoms are located in the other of the two orthogonal directions.

In a fourth aspect of the present invention, an axially extending cavity is formed in the vibration isolating rubber in the vicinity of the top of the boundary portion, and a solid connecting leg for connecting the inner cylinder and the outer cylinder is formed in the vibration isolating rubber in the vicinity of the bottom.

In a fifth aspect of the present invention, multiple stoppers each of which axially projects from an end in the axial direction of the vibration isolating rubber are provided in the circumferential direction, wherein the stoppers are provided in positions corresponding to the cavity and the connecting leg, and the stopper corresponding to the cavity projects at a higher level than the stopper corresponding to the connecting leg.

In a sixth aspect of the present invention, a forward end portion at the time of mounting is formed as an engaging head portion of vibration isolating rubber which projects from the outer cylinder.

According to the invention as defined in the first aspect, since the boundary portion is changed in height in the axial direction of the outer cylinder such that the contact area between the inner peripheral surface of the mounting hole and the large diameter portion is gradually increased, when the outer cylinder is press-fitted into the mounting hole provided in the mounted member, the press fitting load at the time of press fitting is gradually increased in accordance with the press fitting stroke so that there is no rapid rise in the press fitting load thereby to prevent the bad influence by the rapid rise in the press fitting load.

According to the invention as defined in the second aspect, since the boundary portion is formed substantially in an inverted U-shape, the rapid rise preventing structure of the press fitting load can be easily formed.

According to the invention as defined in the third aspect, the tops and bottoms of the boundary portion are oppositely arranged alternately and in pairs respectively, and the tops are located for example in an X direction of two orthogonal directions (hereinafter, referred to as X direction and Y direction) meeting at right angles with an axial direction (hereinafter, referred to as Z direction) of the outer cylinder while the bottoms are located in the Y direction. Therefore, the press fitting load has a directional property. It is possible to make the press fitting load greater only in the necessary direction (for example, in the X direction).

According to the invention as defined in the fourth aspect, the axially extending cavity is formed in the vibration isolating rubber in the vicinity of the top of the boundary portion, and the solid connecting leg for connecting the inner cylinder and the outer cylinder is formed in the vibration isolating rubber in the vicinity of the bottom, so that it is possible to decrease the influence upon spring of the vibration isolating rubber because of reduction of the diameter of the outer cylinder at the time of press fitting.

According to the invention as defined in the fifth aspect, the vibration isolation rubber is weak in the spring of the X direction and strong in the spring of the Y direction for example, by provision of the cavity and the connecting leg. Therefore, when torsion is generated in relation to the inner cylinder, the side of the cavity (in this case, the X direction) becomes weak in relation to the torsion. However, since multiple stoppers each of which axially projects from an end in the axial direction of the vibration isolating rubber are provided in the circumferential direction, corresponding to the cavity and the connecting leg, and the stopper corresponding to the cavity projects at a higher level than the stopper corresponding to the connecting leg, the weak spring side can be stiffened strongly by the higher stopper, and the spring against the torsion can be controlled such that it becomes the same level as the connecting leg side.

According to the invention as defined in the sixth aspect, since the forward end portion at the time of mounting is formed as the engaging head portion of vibration isolating rubber which projects from the outer cylinder, the vibration isolating rubber of the engaging head portion can be kept free without restraint of the outer cylinder until mounting. Therefore, the vibration isolating rubber can be released from a molding deformation before mounting, thereby making it possible to improve the durability.

DETAILED DESCRIPTION OF THE PREFERRED EMBODIMENT

Figure 1:
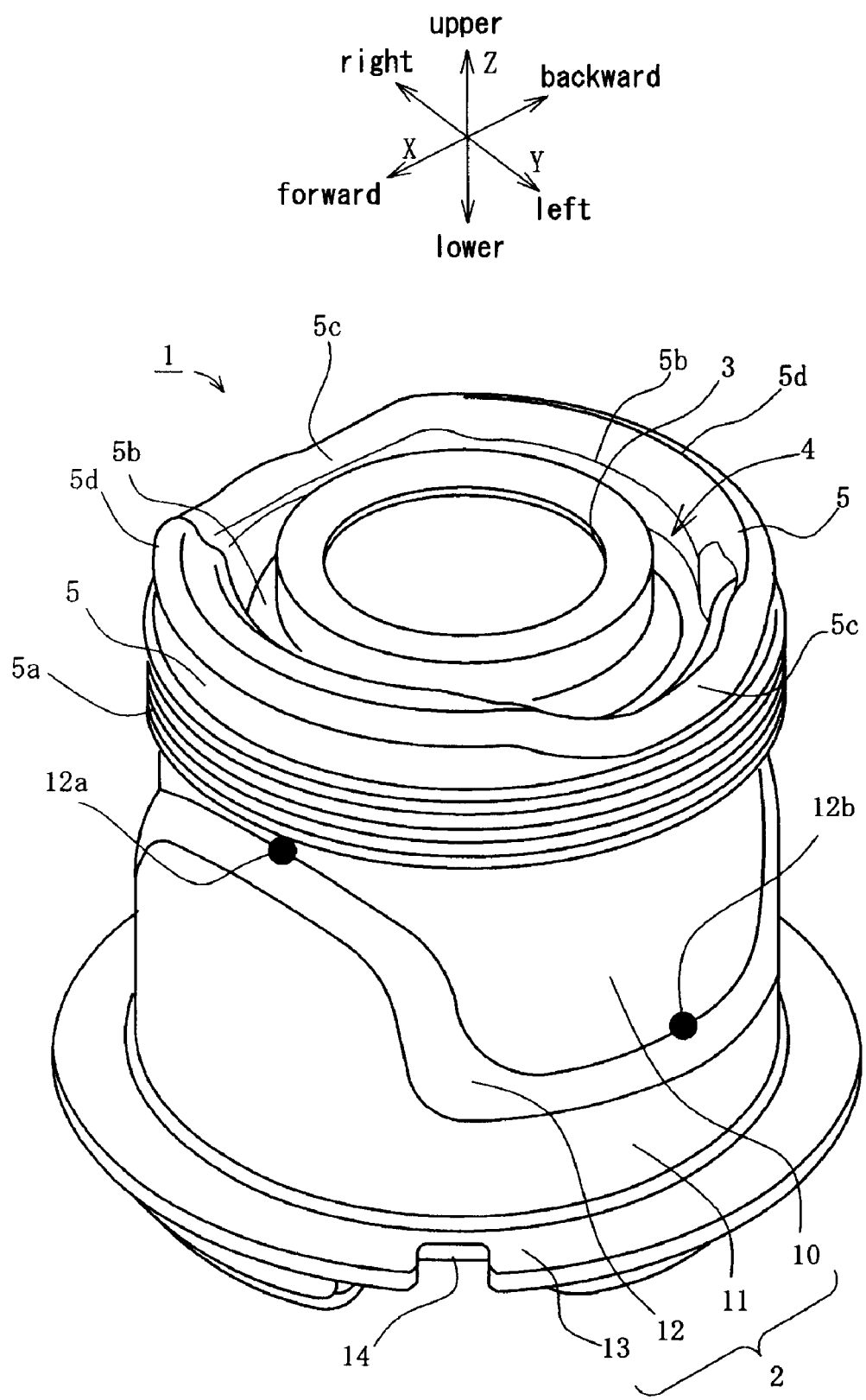
FIG. 1 is a perspective view of a sub-frame mount according to the first embodiment of the present invention.
Figure 2:
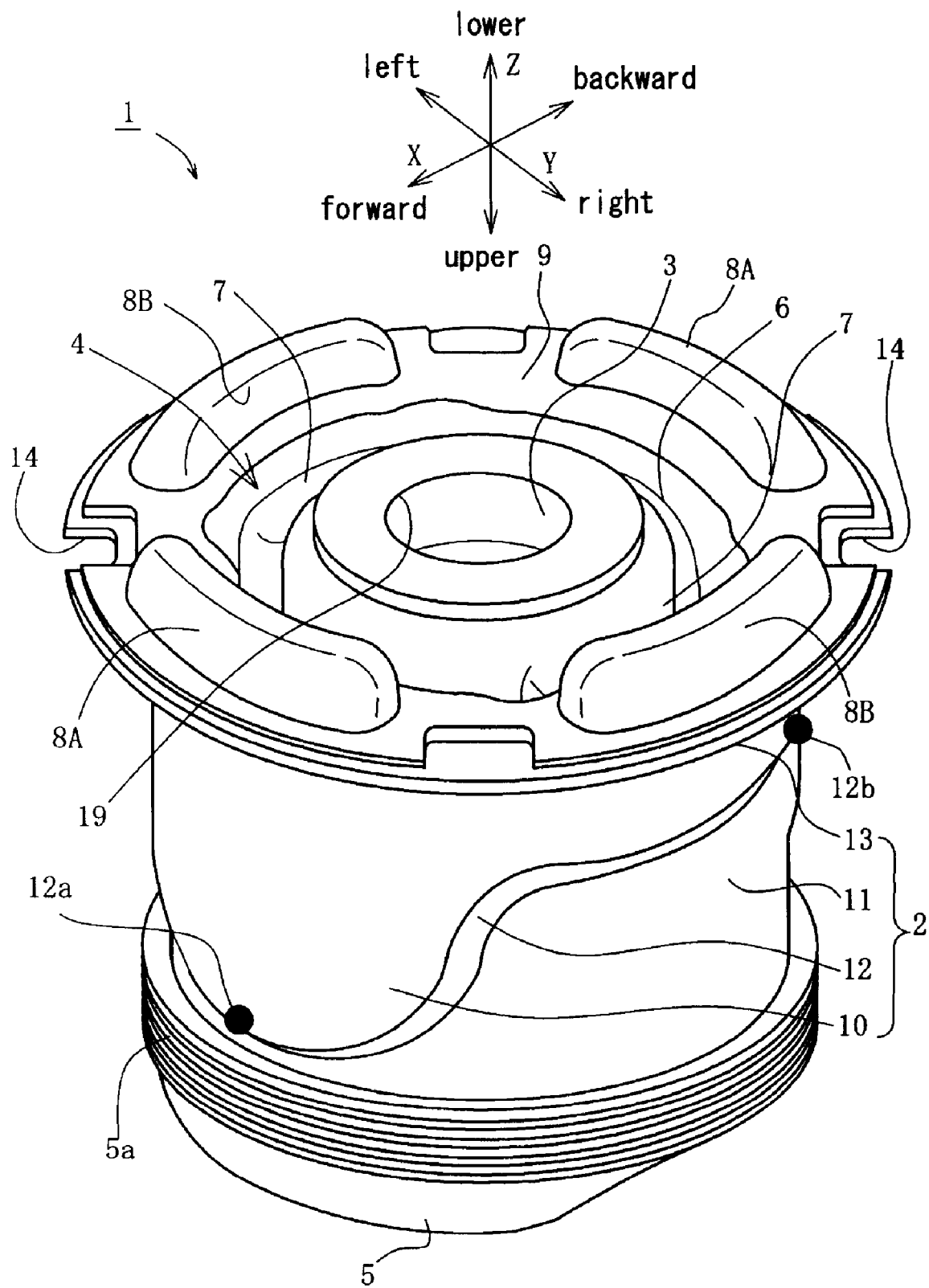
FIG. 2 is a perspective view of the sub-frame mount which is turned upside down from FIG. 1.
Figure 3:
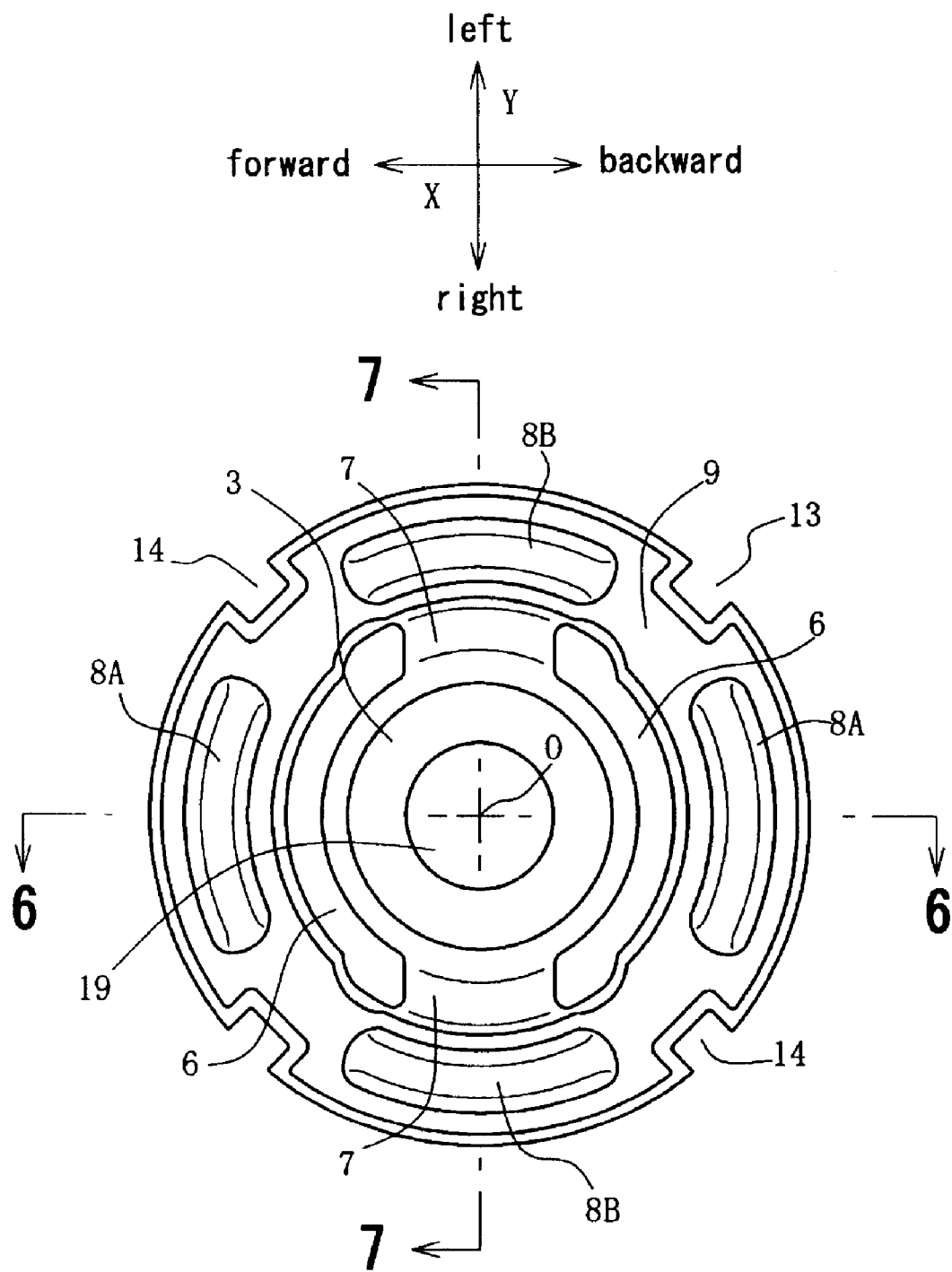
FIG. 3 is a bottom view of the sub-frame mount.
Figure 4:
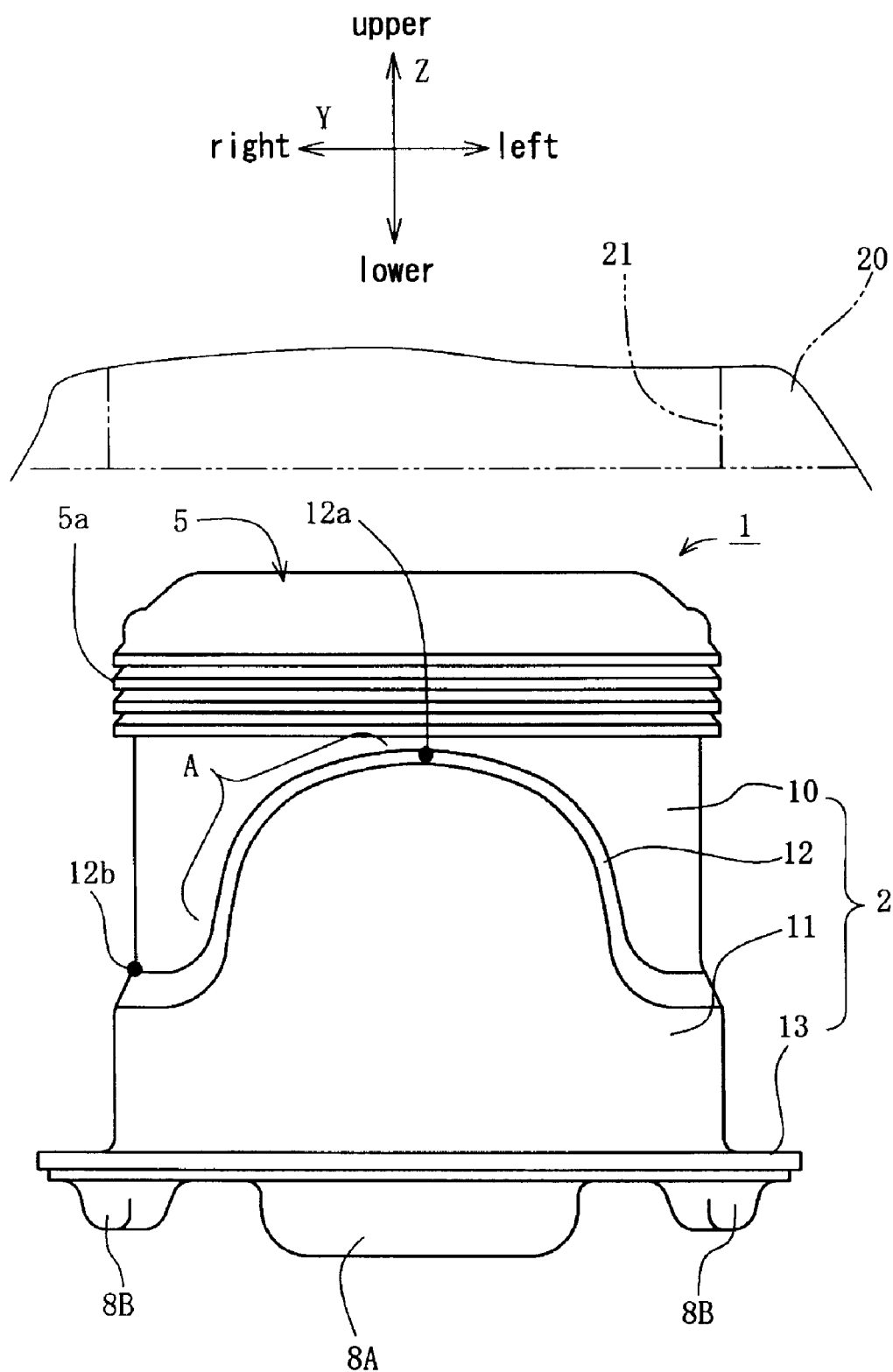
FIG. 4 is a front view of the sub-frame mount.
Figure 5:
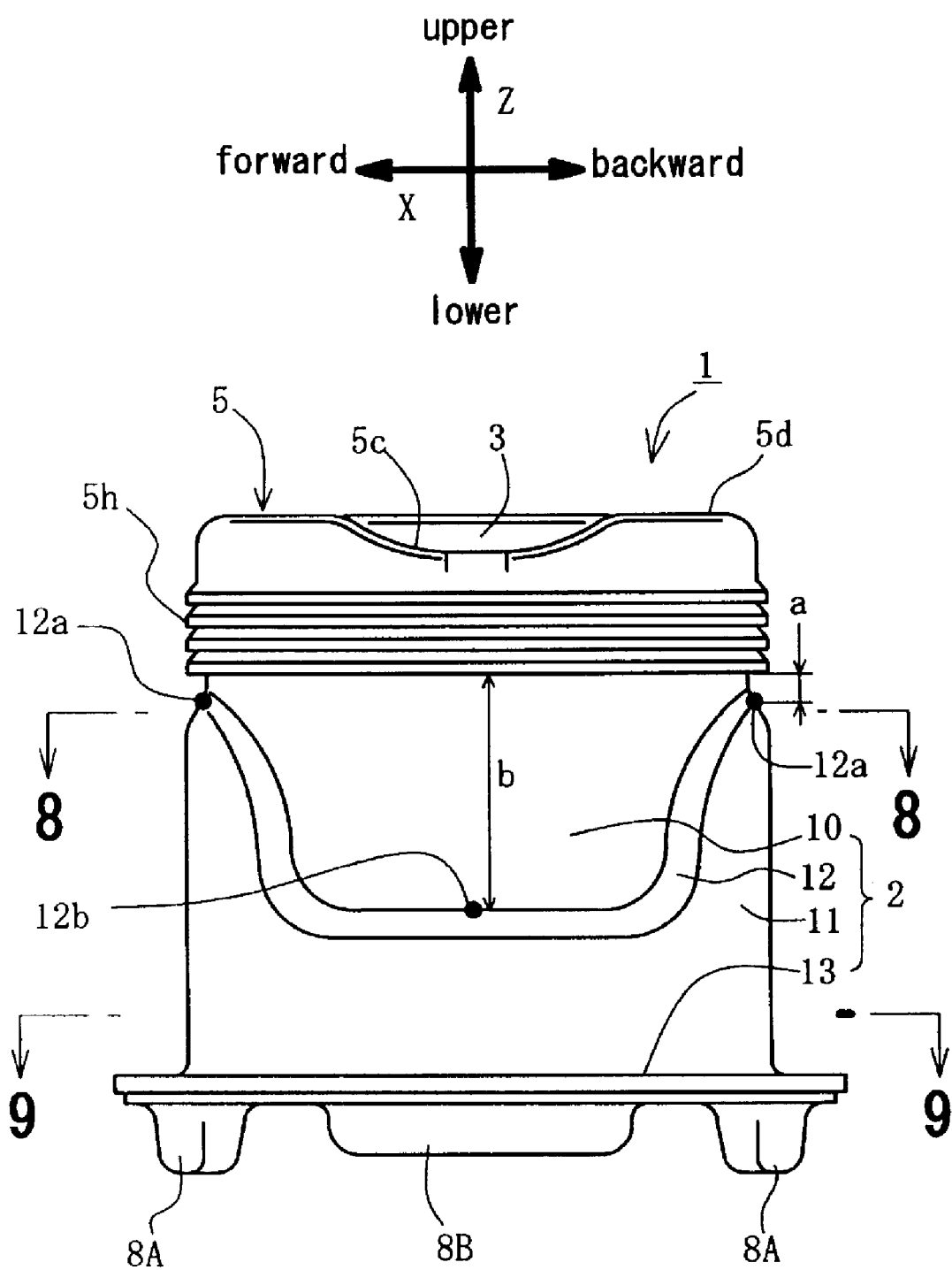
FIG. 5 is a side view of the sub-frame mount.
Figure 6:
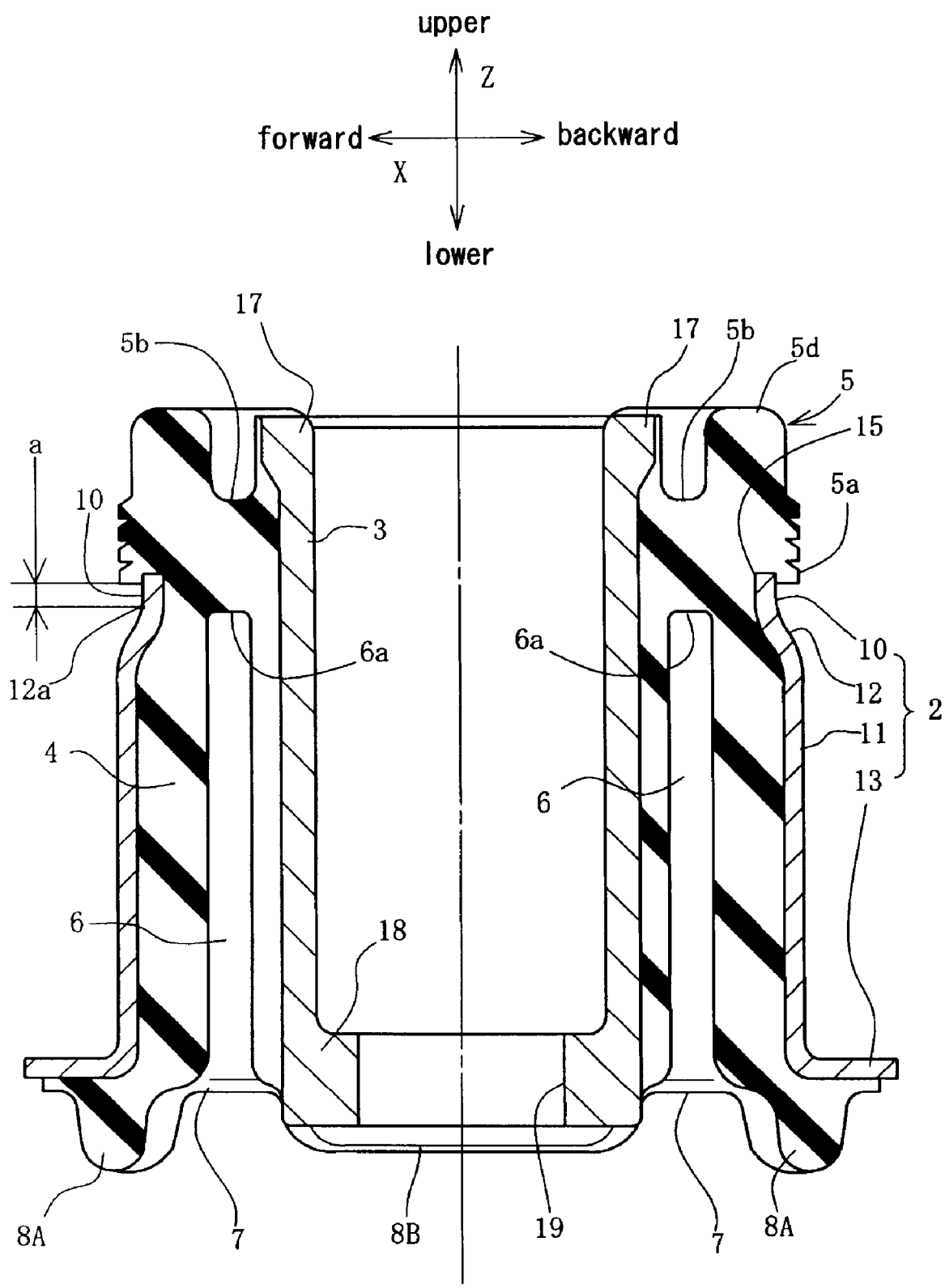
FIG. 6 is a cross sectional view taken on the line 6-6 of FIG. 3.
Figure 7:
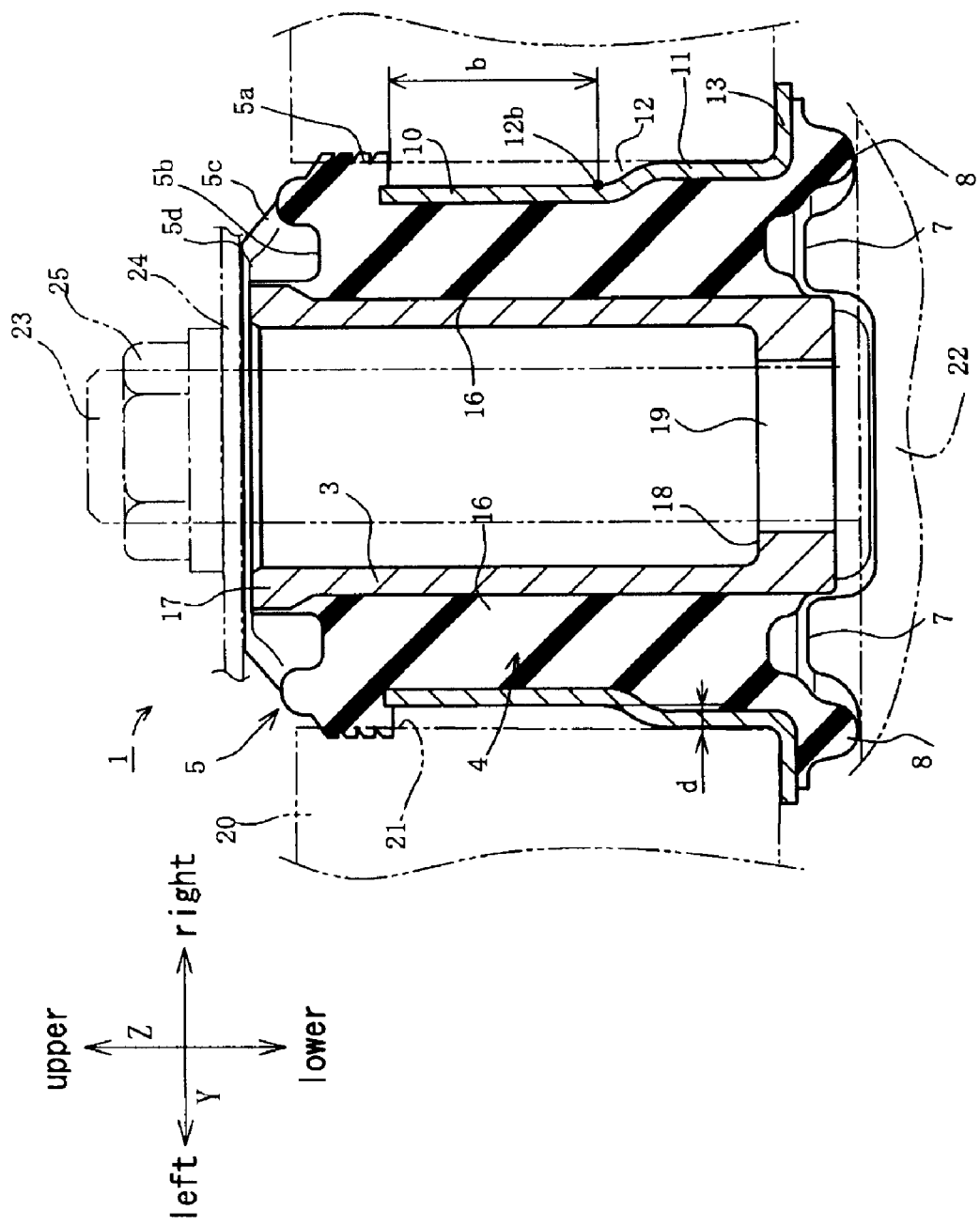
FIG. 7 is a cross sectional view taken on the line 7-7 of FIG. 3.
Figure 8:
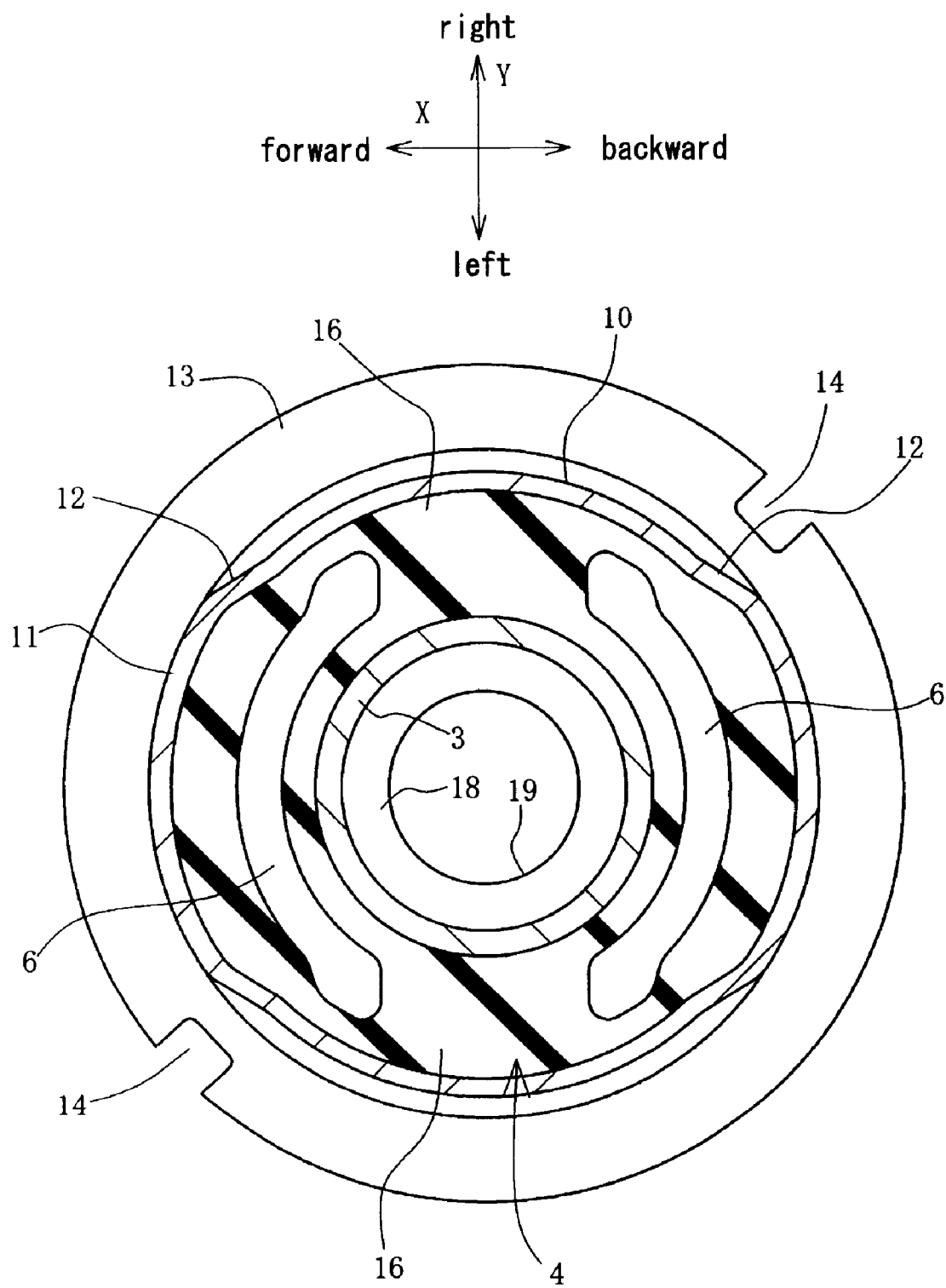
FIG. 8 is a cross sectional view taken on the line 8-8 of FIG. 5.
Figure 9:
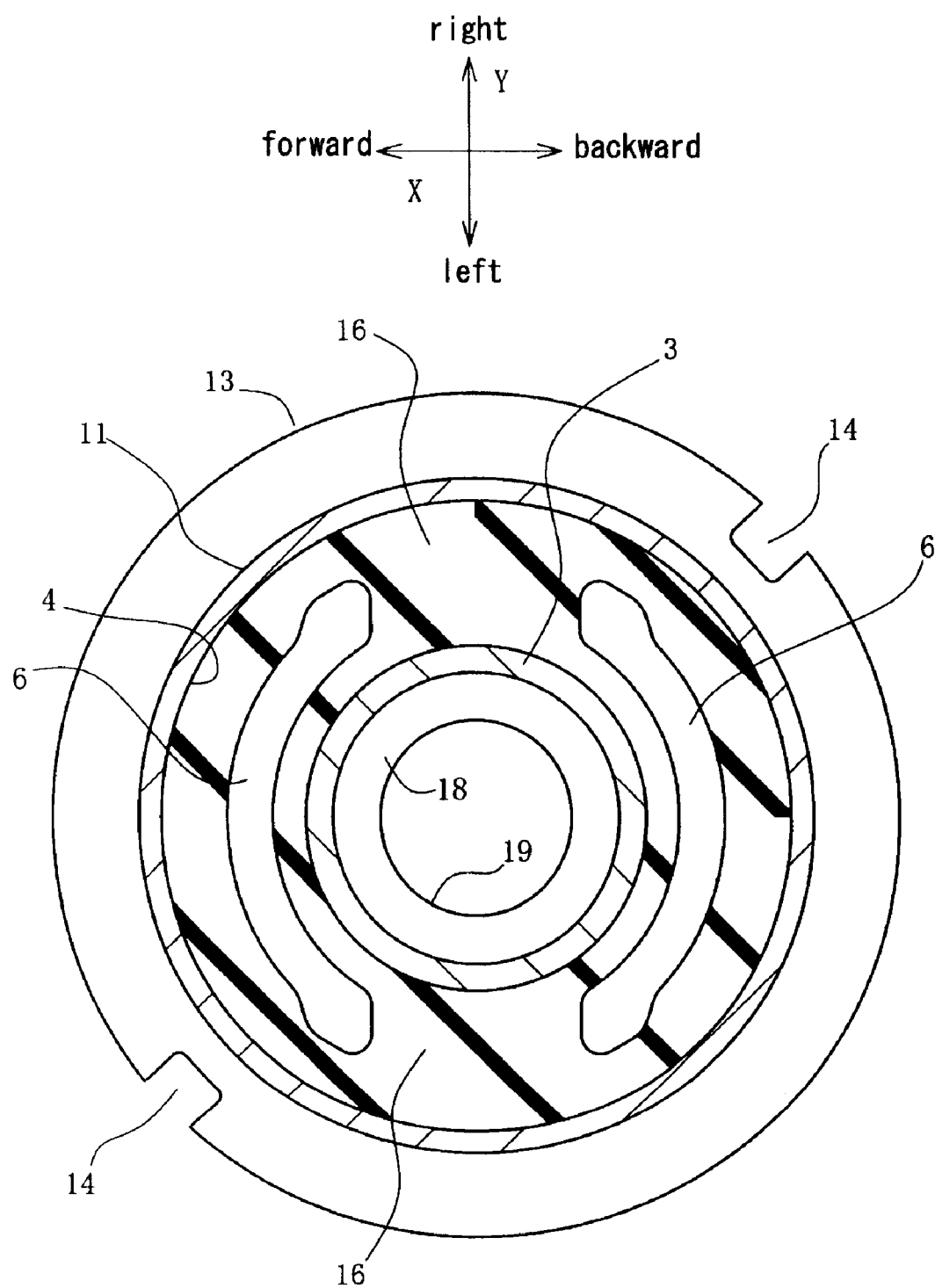
FIG. 9 is a cross sectional view taken on the line 9-9 of FIG. 5.
Figure 10:
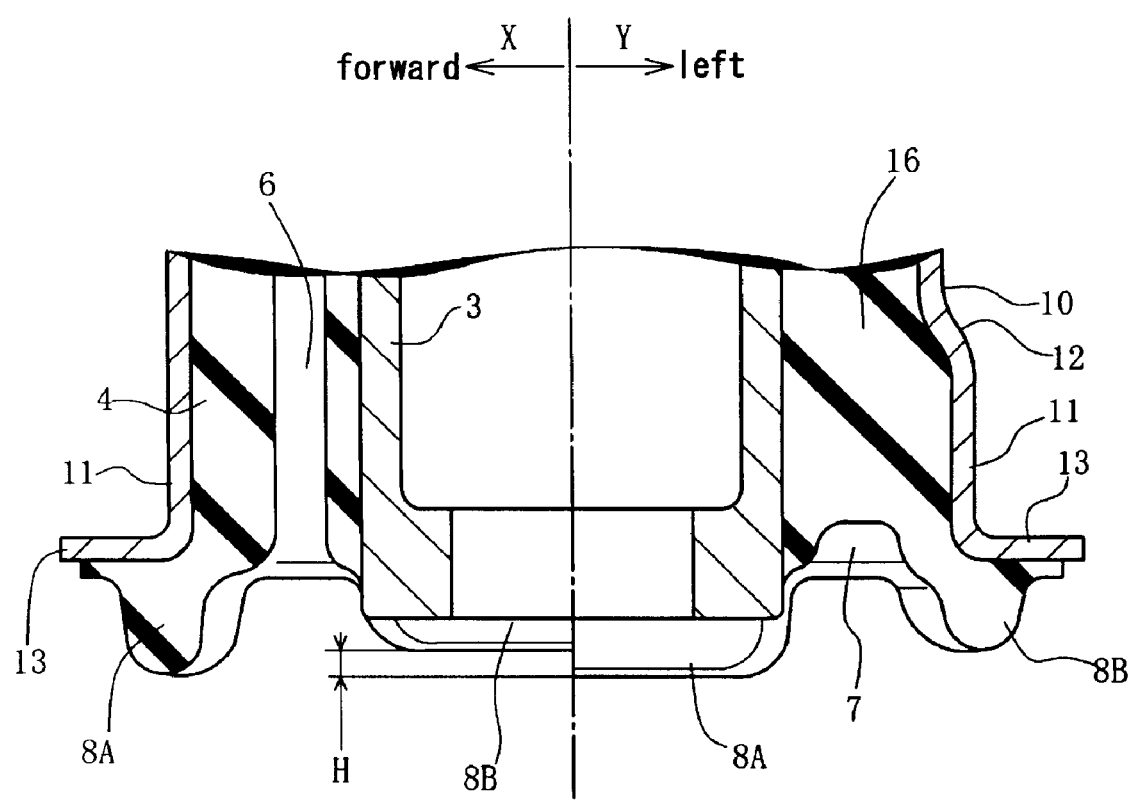
FIG. 10 is a partial cross sectional view taken along the line 6-O-7 of FIG. 3.

Hereinafter, an embodied example applied to a sub-frame mount will be explained with reference to the accompanying drawings, wherein FIG. 1 is a perspective view of the sub-frame mount according to the first embodied example of the present invention, FIG. 2 is a perspective view thereof which is turned upside down, FIG. 3 is a bottom view thereof, FIG. 4 is a front view thereof, FIG. 5 is a side view thereof, FIG. 6 is a cross sectional view taken on the line 6-6 of FIG. 3, FIG. 7 is a cross sectional view taken on the line 7-7 of FIG. 3, FIG. 8 is a cross sectional view taken on the line 8-8 of FIG. 5, FIG. 9 is a cross sectional view taken on the line 9-9 of FIG. 5, and FIG. 10 is a partial cross sectional view taken along the line 6-O-7 of FIG. 3. In this embodied example, each direction of the sub-frame mount such as an upper and lower direction, a forward and backward direction and a right and left direction is fixed on the basis of a mounted state on the vehicle body, Moreover, orthogonal three-axis directions of X, Y and Z correspond to the forward and backward direction, the right and left direction and the upper and lower direction respectively.

Referring now to these drawings, the sub-frame mount 1 comprises an outer cylinder 2 and an inner cylinder 3 each made of metal, and a vibration isolating rubber 4 for connection between the outer cylinder 2 and the inner cylinder 3. The vibration isolating rubber 4 is an elastomer constituting the core of vibration isolation and is made of a rubber of proper composition. The vibration isolating rubber is formed by a known method that it is vulcanized and adhered integrally to the outer cylinder 2 and the inner cylinder 3 or that it is molded separately and then adhered integrally to them. In FIG. 1 and FIG. 2 there is seen an engaging head portion 5 of the vibration isolating rubber 4. The reference character 6 denotes a bored hole in the shape of an axially extending cavity, and the reference character 7 in FIG. 2 is a recess formed by connection between open ends of the opposed bored holes 6.

The outer cylinder 2 comprises a small diameter portion 10 and a large diameter portion 11 formed on a lateral wall of a cylindrical barrel portion, a boundary portion 12 formed in the shape of a step on the boundary between these small and large diameter portions, and an outer flange 13 formed at an end (lower end) in the axial direction of the barrel portion. The reference character 14 denotes a positioning means of a notch shape formed on the outer flange 13 for locating the position at the time of mounting on the sub-frame as described later.

As shown in FIG. 2 and FIG. 3, in a lower end portion (an upper end in the illustrated state) of the vibration isolating rubber 4 there is integrally formed a cover portion 9 for covering the outer flange 13. Stoppers 8A and 8B are formed integrally on this cover portion 9 in a state of projecting therefrom. The four stoppers 8A and 8B are provided at intervals of 90° and each formed on an X axis or a Y axis. Herein, the stoppers in the X direction are denoted by 8A while the stoppers in the Y direction are denoted by 8B.

As shown in FIG. 4, the boundary portion 12 is formed substantially in an inverted U-shape or in the shape of a mountain such as to project upwardly toward a central top portion 12a. As shown in FIG. 5, the small diameter portion 10 extends downwardly approximately to a half or more of axial length of the outer cylinder 2 in the Z direction. A bottom portion 12b of the boundary portion 12 is formed in the shape of a straight line. An intermediate portion of the boundary portion 12 extends from the bottom portion 12b to the top portion 12a while drawing a curve. The distance between ridgelines on both sides in the circumferential direction of the top portion 12a is tapered upwardly (see FIG. 4). In FIG. 4, the reference character 20 denotes a sub-frame on which the sub-frame mount 1 is mounted, and the reference character 21 denotes a mounting hole.

As shown in FIG. 6, the bored hole 6 is provided in pairs in front and in the rear across a center axis and is formed with a downwardly open blind hole which extends from the bottom of the vibration isolating rubber 4 to the position in the vicinity of the upper end thereof. The provision of the bored hole 6 makes the spring rate in the X direction lower. An axial end of the bored hole 6 is expanded and connected to the recess 7. The distance "a" between a seal portion 5a and the top portion 12a is small so that the large diameter portion 11 comes into contact with an inner wall of the mounting hole 21 (see FIG. 4) from the beginning of the press fitting of the sub-frame 1.

An upper end 15 of the outer cylinder 2 is planted in and united with the inside of the engaging head portion 5. On the outer periphery of the engaging head portion 5 there is provided the outwardly protruded seal portion 5a which tightly contacts and waterproofs an inner wall of the mounting hole 21 when press-fitting the sub-frame mount 1 from a lower side into the mounting hole 21 of the sub-frame 20 as shown in FIG. 4 on which the sub-frame mount is mounted. The outer diameter of the seal portion 5a is formed larger than the inner diameter of the mounting hole 21.

As shown in FIG. 7, there is formed no bored hole 6 in the right and left direction of the vibration isolating rubber 4 but there is formed a solid connecting leg 16 for connecting the outer cylinder 2 and the inner cylinder 3. The spring rate in the Y direction of the vibration isolating rubber 4 becomes higher by this connecting leg 16. Namely, there is a difference in the magnitude of the spring rate in the X direction and that in the Y direction so that the spring ratio between the X direction and the Y direction is varied. This spring ratio may be freely controlled by varying the size or the like of the bored hole 6 and the connecting leg 16. The distance "b" between the seal portion 5a and the bottom portion 12b is greater (a<b) in the right and left direction, so that in the right and left direction the large diameter portion 11 is prevented for a while after starting the press fitting of the sub-frame mount 1 from coming into contact with the inner wall of the mounting hole 21.

On an outer periphery of an upper end of the inner cylinder 3 there is provided an enlarged portion 17 which protrudes outwardly in a radial direction in such a way as to run up onto an inner periphery of an upper end of the vibration isolating rubber 4 and to be united therewith. In this embodied example, the vibration isolating rubber is formed by being vulcanized after filling a space between the outer cylinder 2 and the inner cylinder 3 with the vibration isolating rubber 4. At the time of this vulcanization, the vibration isolating rubber 4 adheres to the outer cylinder 2 and the inner cylinder 3 so as to be united therewith. As described above, however, another method of forming the vibration isolating rubber 4 may be applied.

A groove 5b is formed on an upper end wall of the engaging head portion 5 in the vicinity of the enlarged portion 17. This groove 5b has different widths in a cross section in the X direction and in a cross section in the Y direction, and the cross section in the X direction is narrower. The cross section in the Y direction has a cutout portion 5c on an upper outward side of the groove 5b so as to be open outwardly. An upper stopper 5d is provided to project upwardly on an outer peripheral side of the groove 5b. A portion of this upper stopper 5d is lowered to form the cutout portion 5c.

The inner cylinder 3 has a cylindrical bottom 18 in which a through hole 19 is formed. Into this through hole 19 is inserted a bolt 23 which projects upwardly from a vehicle body frame 22. The bolt 23 passes through the inside of the inner cylinder upwardly and is fixedly fastened by a nut 25 through the intermediary of a plate 24 which contacts the upper side of the upper stopper 5d. The upper stopper 5d is formed integral with the engaging head portion 5, so that a separate upper stopper which conventionally is mounted on the upper end of the inner cylinder 3 can be omitted. Further, the lower ends of the stoppers 8A and 8B projecting downwardly from the lower end of the vibration isolating rubber 4 also contact or come close to the vehicle body frame 22.

A clearance "d" is provided between the small diameter portion 10 and the inner wall of the mounting hole 21, and because of this clearance "d", the small diameter portion 10 does not come into contact with the inner wall of the mounting hole 21 so as not to generate the press fitting load. The large diameter portion 11 comes into tight contact with the inner wall of the mounting hole 21 so that the press fitting load is generated in accordance with the dimensions of contact area. The outer flange 13 contacts with the lower end surface of the sub-frame mount 20 and locates the position of the sub-frame mount 21 in the upper and lower direction.

The bored hole 6 does not pass through the full length of the vibration isolating rubber 4 but is open downwardly while an upper end 6a thereof ends at the level of the engaging head portion 5. The engaging head portion 5, which is formed by the solid portion of the vibration isolating rubber 4 and connected to the connecting leg 16, comes into direct contact with the inner wall of the mounting hole 21 without having the outer cylinder 2 provided around the outer periphery thereof. On the outer periphery of the engaging head portion 5 there are formed an annular seal portion 5a of corrugated cross section in plural stripes which is elastically deformed to come into tight contact with the inner wall of the mounting hole 21 when the engaging head portion 5 is press-fitted into the mounting hole 21. The seal portion 5a has a larger outer diameter (before mounting) than the outer diameter of the large diameter portion 11.

The engaging head portion 5 is press-fitted into the mounting hole 21 without interposition of the outer cylinder 2, and the outer peripheral portion thereof constitutes an elastomer contact portion against the inner peripheral portion of the mounting hole 21. The engaging head portion 5 at the time of press fitting is compressed and elastically deformed while repeating compression and tension by displacement in the forward and backward direction and in the right and left direction of the sub-frame mount 1. The large diameter portion 11 constitutes a metal contact portion. The small diameter portion 10 constitutes a non-contact portion against the mounting hole 21.

Further, the engaging head portion 5 is kept free without restraint of the periphery thereof by the outer cylinder 2 until it is press-fitted into the mounting hole 21. Therefore, the molding deformation (vulcanizing deformation) of the vibration isolating rubber 4 created when the vibration isolating rubber 4 is formed integral with the outer cylinder 2 and the inner cylinder 3 is released for the most part before being press-fitted into the mounting hole 21 whereby it is possible to decrease the molding deformation. Thus, the durability can be improved.

As shown in FIG. 8, the small diameter portion 10 is formed by being narrowed in the right and left direction. The end of the bored hole 6 is located in the vicinity of the inside of the boundary portion 12. The bored hole 6 is provided inside of the large diameter portion 11, and the opening portion thereof is formed in the shape of a circular arc of the larger radius of curvature than that of the large diameter portion 11 and extends to the position close to the small diameter portion 10 on both sides of an X axis. This bored hole is provided in pairs in front and behind across the inner cylinder 3.

As shown in FIG. 9, in the lower portion of the outer cylinder 2 the small diameter portion is not formed but only the large diameter portion 11 is provided. Therefore, the large diameter portion 11 has a single ring shape of a prefixed diameter in circumference.

As shown in FIG. 10, the stoppers 8A and 8B are provided in pairs to be four pieces in total, the respective pair being opposed to each other while crossing the X axis or the Y axis. The stoppers 8A and 8B are different in height. Namely, the stopper 8A in the X direction is higher by H than the stopper 8B in the Y direction so as to project by H downwardly.

With this structure, the control of the spring ratio against torsion becomes possible. That is, the spring rate in the X direction and in the Y direction of the vibration isolating rubber 4 itself is small in the X direction due to the bored hole 6 and large in the Y direction due to the connecting leg 16. Accordingly, if the stoppers are identical in the X direction and in the Y direction, the spring rate against torsion in the X direction ought to be smaller than the spring rate in the Y direction when the torsion with respect to the Z axis acts on the inner cylinder 3.

However, as the stopper 8A in the X direction is higher by the projecting height H than the stopper 8B in the Y direction, by this stopper 8A an interference at the time of the torsional deformation becomes greater than that of the stopper 8B in the Y direction so as to make the spring rate larger for that, so that the spring rate against torsion in the X direction can be adjusted at the same level as that in the Y direction, thereby making it possible to equalize the spring rate against torsion.

This means that the control of the spring ratio against torsion in the X direction and in the Y direction can be done freely. By adjusting the projecting height H of the stopper 8A in relation to the stopper 8B, the spring ratio in the X direction and in the Y direction is able to be freely controlled. Moreover, the spring rate in the Y direction is able to be freely increased. In this case, the projecting height of the stopper 8B is increased or the sub-frame mount 1 is tuned 90° and mounted.

Next, the operation of this embodied example will be explained hereunder. As shown in FIG. 4, the sub-frame mount 1 is press-fitted into the mounting hole 21 of the sub-frame 20 while inserting the engaging head portion 5 first from the bottom of the mounting hole 21. Then, the engaging head portion 5 including the seal portion 5a is inserted into the mounting hole 21 as it is compressed and deformed. At this time, since because of existence of the small diameter portion 10, the outer cylinder 2 does not contact the inner wall of the mounting hole 21, the engaging head portion 5 is able to be press-fitted into the mounting hole 21 under light press fitting load. Thereafter, when the large diameter portion is press-fitted, it comes into contact with the inner wall of the mounting hole 21 so as to have the press fitting load increased. Then, since there is the difference in the contact area between the X direction and the Y direction, and since the distance between the seal portion 5a and the top portion 12a is small in the forward and backward (X) direction, the load becomes greater from the beginning of the press fitting. However, since the distance "a" between the seal portion 5a and the bottom portion 12b is large, the load is not increased until approaching the end of the press fitting.

Moreover, the boundary portion 12 is formed in the shape of slope gradually expanding its diameter from the small diameter portion 10 to the large diameter portion 11 and also formed in the shape of a curved line in the direction facing from the top portion 12a to the bottom portion 12b in such a manner that the distance between both sides of the top portion 12a is tapered upwardly. Accordingly, the press fitting load is gradually increased. Thus, since the press fitting load is able to be gradually increased without rapid increase, the press fitting operation may be performed easily and it is possible to prevent the damage of the vibration isolating rubber 4 and the generation of cracks in the welded portion on the side of the sub-frame 20.

Figure 11:
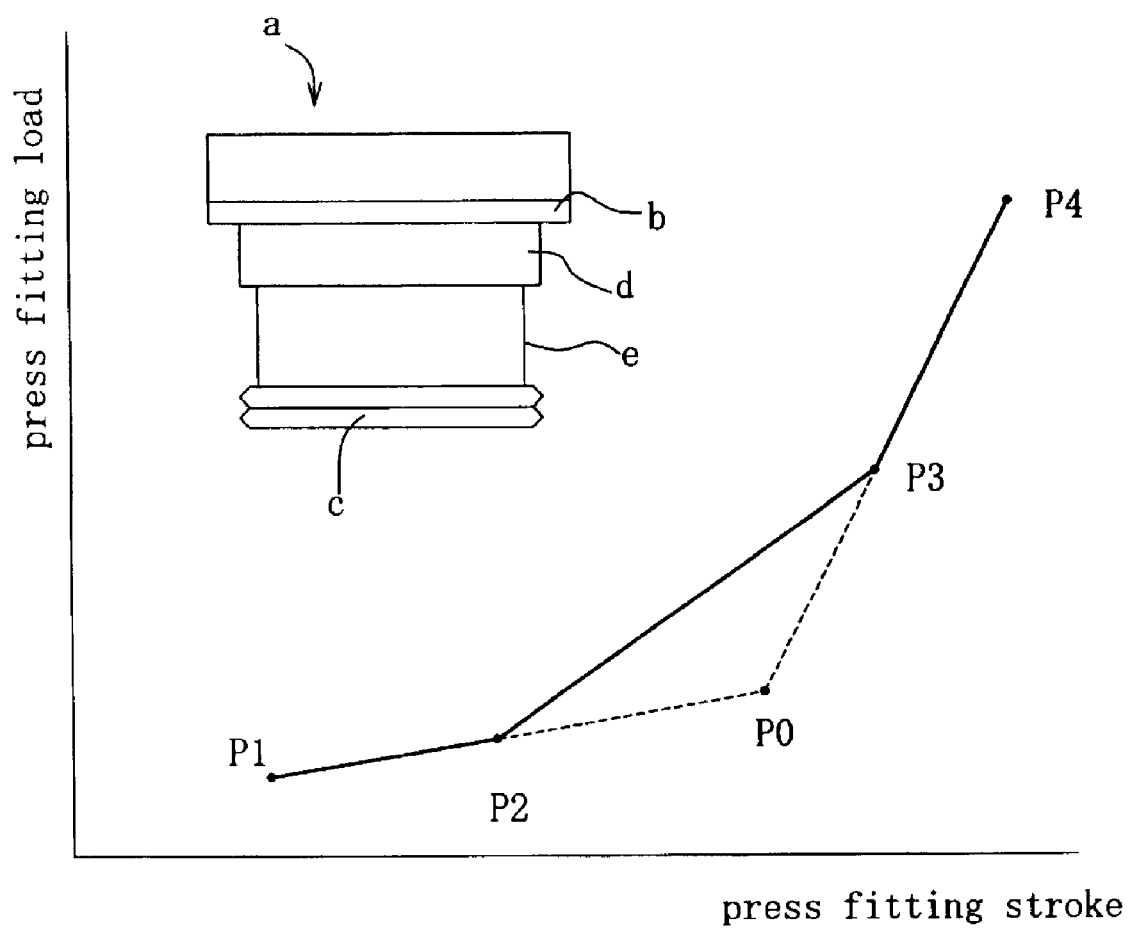
FIG. 11 is a graph showing the change in press fitting load.

The change of this press fitting load will be explained with reference to FIG. 11. Firstly when the engaging head portion 5 is press-fitted at a starting point P1 of the press fitting, the press fitting load rises at comparatively small value and in the less change state of a gentle slope. When the top portion 12a comes into contact with the inner wall of the mounting hole at the point P2, the load is increased slightly. Thereafter, the press fitting load is gradually increased with gradual increase of the contact area until the bottom portion 12b contacts the inner wall of the mounting hole at the point P3. At this time, the slope of line P2-P3 is more than the slope of line P1-P2 and less than the slope of line P3-P4. When reaching the point P3, an entire periphery of the large diameter portion 11 contacts the inner wall of the mounting hole, so that the load is increased rapidly in the same manner as the conventional example. When reaching the point P4, the outer cylinder comes into contact with the inner wall of the mounting hole. The line P3-P4 corresponds to a straight line P0-P4 of the conventional example.

As described above, in comparison with the points P2-P0-P3 of the conventional example as shown in dashed line, since in this embodied example it is possible to change the press fitting load like the line P2-P3 of a little steeper slope than the line P2-P0, the press fitting load is able to be changed in three stages of gradually increased slopes like the line P1-P2, the line P2-P3 and the line P3-P4 without the rapid change of the press fitting load as developed at the point P0 in the conventional example. Therefore, the rapid rise of the press fitting load can be prevented and the bad influence upon the vibration isolating rubber 4 and the sub-frame 20 can be avoided.

Moreover, it is possible to freely adjust the slope or the like of the line P2-P3 by adjusting an angle of the slope changing from the small diameter portion 10 to the large diameter portion 11 of the boundary portion 12, and the variation from the top portion 12a to the bottom portion 12b (an angle of the ridgeline as shown in FIG. 4). Also, if the variation from the top portion 12a to the bottom portion 12b is changed in multiple stages, it is possible to change the press fitting load more between the points P2-P3 in the multiple stages.

Furthermore, when the contact area of the large diameter portion 11 is larger and the contact area of the small diameter portion 10 is smaller in the forward and backward direction, the forward and backward direction (X direction) which is a reference of fixation with respect to the sub-frame 20 in the X plane and Y plane can be firmly fixed on the sub-frame 20. However, when the right and left direction (Y direction) is used as the reference, the contact area of the large diameter portion 11 may be made largest in the Y direction by having turned 90°.

Further, since the top portion 12a is provided in the vicinity of the seal portion 5a, and since the distance between the seal portion 5a and the top portion 12a is small, the top portion 12a is able to be in contact with the inner wall of the mounting hole 21 from the beginning of the press fitting, so that the forward and backward direction can be used as a guide at the time of the press fitting.

Figure 12:
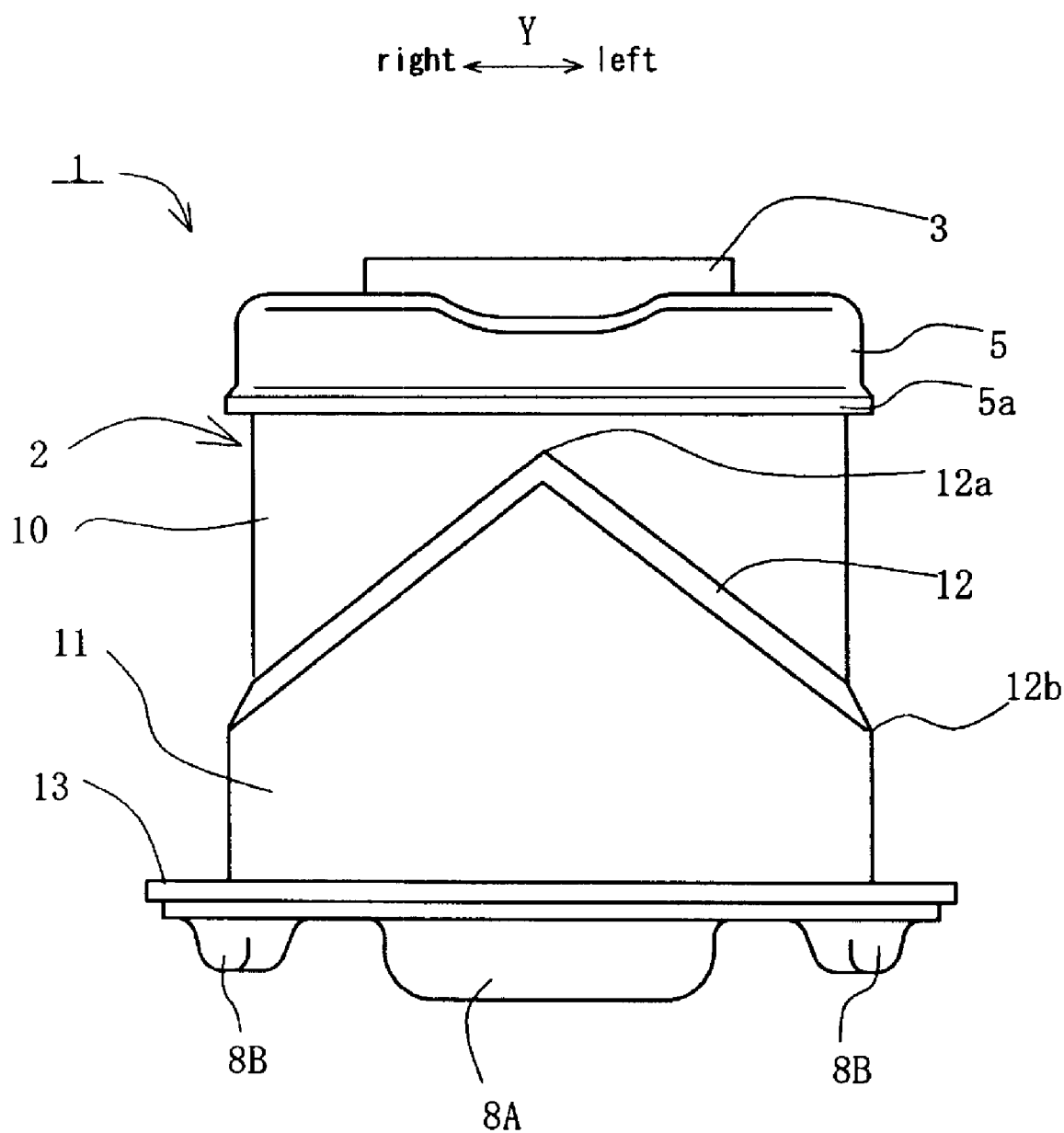
FIG. 12 is a front view showing another embodiment of the sub frame mount.

FIG. 12 is a front view of another embodied example of which the shape of the boundary portion 12 is modified. In this example, the boundary portion 12 is formed in the shape of a triangular mountain or a chevron with a top portion of an acute angle. As formed like this, the contact area at the time of the press fitting is able to be lessened thereby having the press fitting load decreased so that the press fitting operation can be easily performed. Like this, the shape of the boundary portion 12 can be varied from the one of a straight line to the one of a curved line. In addition, the curved line shape also can be varied freely in accordance with the press fitting load to be selected.

It is to be understood that the present invention is not limited to each of the above described embodied examples, and that modifications and applications may be variously made within the scope and sprit of the invention. For example, the present invention is applicable to various kinds of known cylindrical vibration isolating devices such as a suspension bushing, etc. other than the sub-frame mount.

What is claimed is:

1. A cylindrical vibration isolating device comprising an inner cylinder and an outer cylinder being connected through a vibration isolating rubber, a small diameter portion and a large diameter portion being provided on a lateral wall of a barrel portion of said outer cylinder, wherein a boundary portion between said small diameter portion and said large diameter portion is formed in a shape of a step having a top and a bottom spaced from said top in a circumferential direction of the lateral wall such that the boundary portion changes height in an axial direction of said outer cylinder and in the circumferential direction of the lateral wall of said outer cylinder such that, when said outer cylinder is press-fitted into a mounting hole provided in a mounted member, a contact area between an inner peripheral wall of said mounting hole and said large diameter portion is gradually increased.

2. The cylindrical vibration isolating device according to claim 1, wherein said top of said boundary portion projects on a forward side at a time of press fitting.

3. The cylindrical vibration isolating device according to claim 2, wherein said top and said bottom of said boundary portion are arranged alternately and in pairs respectively in a circumferential direction of the lateral wall of said outer cylinder, a pair of tops and a pair of bottoms are opposite to each other across a center axis of the device respectively, and said tops of said boundary portion are located in one of two orthogonal directions meeting at right angles with an axis of said outer cylinder while said bottoms are located in the other of said two orthogonal directions.

4. The cylindrical vibration isolating device according to claim 3, wherein an axially extending cavity is formed in said vibration isolating rubber in a vicinity of said top of said boundary portion, and a solid connecting leg for connecting said inner cylinder and said outer cylinder is formed in said vibration isolating rubber in a vicinity of said bottom.

5. The cylindrical vibration isolating device according to claim 4, wherein multiple stoppers each of which axially projects from an end in an axial direction of said vibration isolating rubber are provided in the circumferential direction, said stoppers are provided in positions corresponding to said cavity and said connecting leg, and said stopper corresponding to said cavity projects greater than said stopper corresponding to said connecting leg.

6. The cylindrical vibration isolating device according to claim 1, wherein a forward end portion at a time of mounting is formed as an engaging head portion of said vibration isolating rubber which projects from said outer cylinder.

7. A cylindrical vibration isolating device comprising an inner cylinder and an outer cylinder being connected through a vibration isolating rubber, a small diameter portion and a large diameter portion being provided on a lateral wall of a barrel portion of said outer cylinder, wherein a boundary portion between said small diameter portion and said large diameter portion is changed in height in an axial direction of said outer cylinder such that, when said outer cylinder is press-fitted into a mounting hole provided in a mounted member, a contact area between an inner peripheral wall of said mounting hole and said large diameter portion is gradually increased,
  wherein a top and a bottom of said boundary portion are arranged alternately and in pairs respectively in a circumferential direction of the lateral wall of said outer cylinder, a pair of tops and a pair of bottoms are opposite to each other across a center axis of the device respectively, and said tops of said boundary portion are located in one of two orthogonal directions meeting at right angles with an axis of said outer cylinder while said bottoms are located in the other of said two orthogonal directions.

8. The cylindrical vibration isolating device according to claim 7, wherein said boundary portion is formed substantially in an inverted U-shape and said top of said boundary portion projects toward a forward end portion of said outer cylinder at a time of press fitting.

9. The cylindrical vibration isolating device according to claim 7, wherein an axially extending cavity is formed in said vibration isolating rubber in a vicinity of said top of said boundary portion, and a solid connecting leg for connecting said inner cylinder and said outer cylinder is formed in said vibration isolating rubber in a vicinity of said bottom of said boundary portion.

10. The cylindrical vibration isolating device according to claim 9, wherein multiple stoppers each of which axially projects from an end in an axial direction of said vibration isolating rubber are provided in the circumferential direction, said stoppers are provided in positions corresponding to said cavity and said connecting leg, and said stopper corresponding to said cavity projects greater than said stopper corresponding to said connecting leg.

11. A cylindrical vibration isolating device comprising an inner cylinder and an outer cylinder being connected through a vibration isolating rubber, a small diameter portion and a large diameter portion being provided on a lateral wall of a barrel portion of said outer cylinder, wherein a boundary portion between said small diameter portion and said large diameter portion includes a top and a bottom spaced from the top in a circumferential direction of the lateral wall and is changed in height in an axial direction of said outer cylinder such that, when said outer cylinder is press-fitted into a mounting hole provided in a mounted member, a contact area between an inner peripheral wall of said mounting hole and said large diameter portion is gradually increased,
  wherein a first stopper and a second stopper axially project from an end of said vibration isolating rubber, said first stopper being circumferentially spaced from said second stopper, said first stopper provided in a position corresponding to said top of said boundary portion and said second stopper provided in a position corresponding to said bottom of said boundary portion, said first stopper projecting greater than said second stopper.

12. The cylindrical vibration isolating device according to claim 11, wherein an axially extending cavity is formed in said vibration isolating rubber in a vicinity of said top of said boundary portion, and a solid connecting leg for connecting said inner cylinder and said outer cylinder is formed in said vibration isolating rubber in a vicinity of said bottom of said boundary portion, and said first stopper is provided in a position corresponding to said cavity and said second stopper is provided in a position corresponding to said connecting leg.

13. The cylindrical vibration isolating device according to claim 11, wherein said boundary portion is formed substantially in an inverted U-shape and said top of said boundary portion projects upwardly toward a forward end portion of said outer cylinder at a time of press fitting, said small diameter portion extending downwardly at least about a half of an axial length of said outer cylinder.

* * * * *